UNITED STATES PATENT OFFICE.

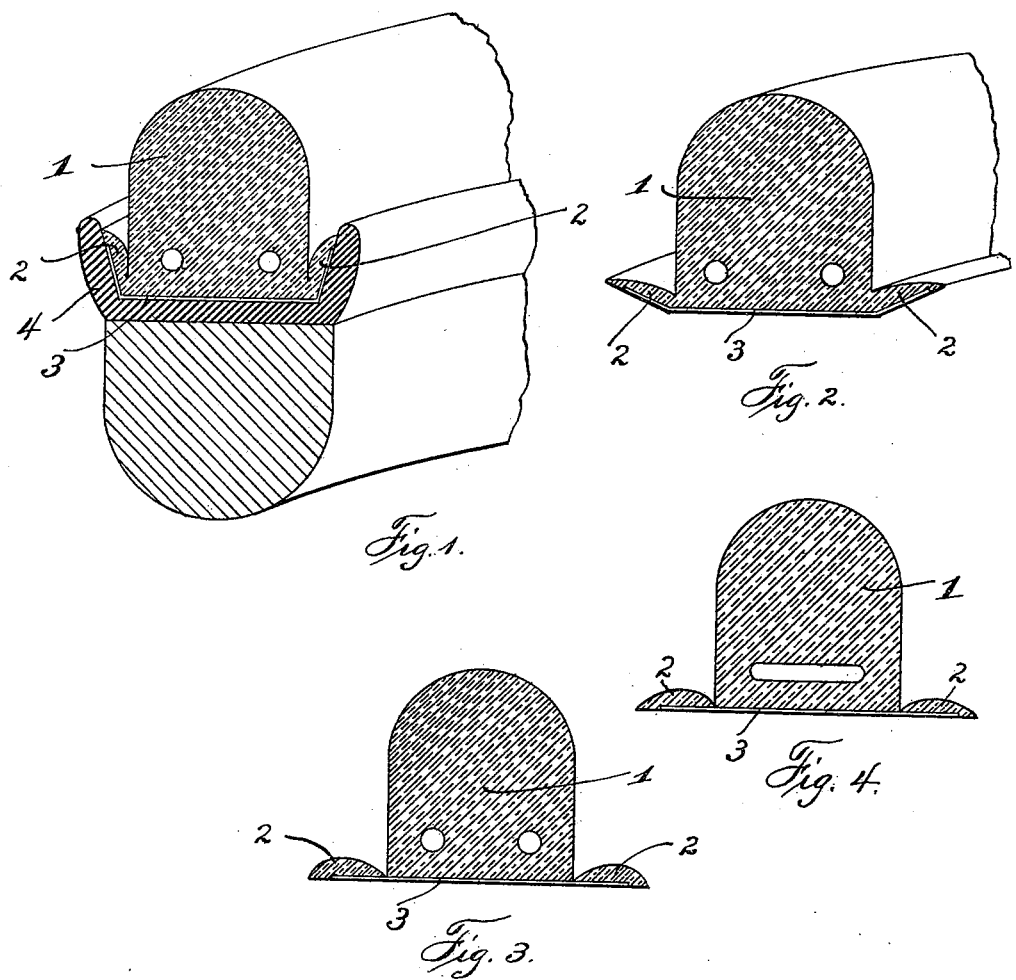

JOSEPH A. BURROWS, OF AKRON, OHIO.

TIRE.

SPECIFICATION forming part of Letters Patent No. 623,703, dated April 25, 1899.

Application filed February 28, 1899. Serial No. 707,171. (No model.)

*To all whom it may concern:*

Be it known that I, JOSEPH A. BURROWS, a citizen of the United States, residing at Akron, in the county of Summit and State of Ohio, have invented certain new and useful Improvements in Tires; and I do hereby declare the following to be a full, clear, and exact description of the invention, such as will enable others skilled in the art to which it appertains to make and use the same.

Heretofore metallic channels for the reception of rubber tires have been made in a variety of forms. In some the side flanges of such channels have been at right angles to the base, in others at obtuse angles, and in still others at acute angles to the base, and generally the rubber tires to be seated in such channels have been of form and size corresponding to the channel. Various methods of securing such tires in their channels have been proposed or adopted—namely, by vulcanizing or clenching or clamping the metallic flanges against the seated portion of the tire or by retaining-bands, round or flat, single or multiple, extending longitudinally through passages in the rubber tires, the ends of such bands having their ends secured together or to the channel or felly of the wheel. To prevent the cutting of the tire by the edges of the channel, it has been proposed to make rounding the peripheries of the flanges along or next the rubber or to make the flanges more or less flaring from the rubber; but it has been found that gravel, sand, water, &c., work into the space between the channel and the tire, resulting in gradual widening of such space and an ultimate loosening and destruction of the tire. It is to meet and overcome these and other objections that my invention is designed; and to this end I so shape the body of the tire that the inner edge of its sides stands well within the metallic channel and entirely clear of and away from the flanges, thus insuring freedom from cutting action and then I provide strips or wings which normally flare out from the inner corners of the tire, but are foldable, so as to enter the channel-iron. These strips perform two functions—namely, first, prevent gravel, sand, &c., from working into the space between the tire proper and the sides of its channel, as well as into the space between the base of the tire and the channel, and, second, they cushion the sides of the tire proper from abrasive contact with the metallic flanges.

It will be observed from the several views of the drawings that I have illustrated two forms of openings for the retaining-bands—namely, round openings in multiple and a single flat opening—so that round bands or wire or a flat band may be employed, the prior practice in this respect teaching that both forms are equivalents. I lay no claim to this feature, however, but show both forms, in order that either may be employed, as may be desired.

In the accompanying drawings, in which I have shown embodiments of my improvements, Figure 1 is a perspective view of a fraction of a wheel-felly with one form of my improved tire in a channel therein, the ends of the parts being shown in cross-section. Fig. 2 is a similar view of the tire removed from the channel, and Fig. 3 is a transverse sectional view of a modified form of the tire. Fig. 4 shows a cross-section of tire with an opening for the reception of a flat retaining-band.

In the drawings like characters of reference designate corresponding parts.

1 designates the body or main portion of the tire, which in cross-section is preferably substantially rectangular in form at its base or inner portion and rounded or curved along its exposed sides and across its outer portion or tread. At or along the inner corners of the base portion are welt-like strips or wings 2, preferably formed upon or attached to the tire proper, so that when the tire is not in the channel they shall tend to stand outwardly from the body thereof, as indicated in Figs. 2 and 3. These wings or strips therefore, when the tire is put into the channel, tend to spring against the sides of the channel 4 and cling thereto, whatever the movements of the tire in its seat. The elastic contact of these wings with the sides of the channel greatly augments the ordinary frictional engagement of the tire with the channel and prevents the cutting or abrasion of the tire proper by the flanges of the channel. In addition to augmenting the frictional engagement of the tire with the channel and acting as a cushion to prevent such cutting, the wings also preclude the access of water, sand, or other foreign things to the space between the tire and the channel and so prevent rotting, cutting, or other destructive action in the tire, thereby greatly prolonging its life.

In the manufacture of the tire I propose to reinforce the inner side of the tire with canvas or other strengthening fabric or material, as usual and as indicated at 3 in the drawings. This fabric or reinforcing material is also extended to the inner side of the wings or strips, but preferably not to the extreme edge thereof, so that there shall be left a small surface of bare rubber, which, by reason of its greater flexibility, clings more closely to the sides of the channel.

What I claim, and desire to secure by Letters Patent, is—

1. A wheel having a channeled rim provided with an elastic tire-body having lateral wings compressed by and between the side flanges of the channel and the sides of the tire-body.

2. A wheel having a channeled rim provided with an elastic tire-body having lateral wings elastically and movably connected therewith, said wings standing between the sides of the tire-body and tending by their own elasticity to cling to the side flanges of the channel.

3. A wheel having a channeled rim provided with an elastic tire-body and lateral elastic wings interposed between the sides of the tire proper and the side flanges of the channel to afford an elastic cushion against which the exposed sides of the tire-body proper may expand and come into contact when compressed.

4. A wheel having a channeled rim provided with an elastic tire-body and a lateral elastic wing interposed between the sides of the tire proper and the adjacent flange of the channel to afford an elastic cushion against which the exposed side of the tire-body proper may expand when compressed.

5. The combination with a rubber tire having lateral wings, of a metallic channel adapted to receive such tire and its wings, the sides of the outer portion of the tire entering the channel at points removed from the flanges, and said lateral wings engaging the inner sides of the flanges and partially filling the space between the flanges and sides of the tire.

In testimony whereof I affix my signature in presence of two witnesses.

JOSEPH A. BURROWS.

Witnesses:
GEO. W. ROGERS,
JAMES W. HOFFERT.